United States Patent
Vehra (10) Patent No.: US 10,816,695 B1
(45) Date of Patent: Oct. 27, 2020

(54) INITIAL GAIN ESTIMATION FOR GAMMA DETECTOR

(71) Applicant: Halliburton Energy Services, Inc., Houston, TX (US)

(72) Inventor: Imran Sharif Vehra, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/402,976

(22) Filed: May 3, 2019

(51) Int. Cl.
| | |
|---|---|
| G01D 18/00 | (2006.01) |
| G01V 13/00 | (2006.01) |
| G01V 5/06 | (2006.01) |
| G01T 1/20 | (2006.01) |
| G01T 1/40 | (2006.01) |
| E21B 49/00 | (2006.01) |
| G01T 7/00 | (2006.01) |
| G01V 5/04 | (2006.01) |

(52) U.S. Cl.
CPC .............. *G01V 13/00* (2013.01); *E21B 49/00* (2013.01); *G01T 1/2006* (2013.01); *G01T 1/2018* (2013.01); *G01T 1/40* (2013.01); *G01T 7/005* (2013.01); *G01V 5/04* (2013.01); *G01V 5/06* (2013.01)

(58) Field of Classification Search
CPC ..... G01T 1/2006; G01T 7/005; G01T 1/2018; G01T 1/40; G01V 5/04; G01V 13/00; G01V 5/06; E21B 49/00
See application file for complete search history.

(56) References Cited

U.S. PATENT DOCUMENTS

| | | | |
|---|---|---|---|
| 2,493,346 A | 1/1950 | Herzog | |
| 5,180,917 A | 1/1993 | Wraight | |
| 8,096,355 B2 * | 1/2012 | McDaniel | E21B 43/26 166/250.1 |
| 10,471,279 B2 * | 11/2019 | Hollebeek | G01T 1/2935 |
| 10,564,299 B2 * | 2/2020 | Fu | G01T 1/248 |
| 2002/0166973 A1 * | 11/2002 | Frederick | G01V 5/06 250/361 R |
| 2005/0199794 A1 | 9/2005 | Mickael et al. | |
| 2011/0186721 A1 | 8/2011 | Galford | |
| 2014/0077073 A1 | 3/2014 | Vu et al. | |

(Continued)

FOREIGN PATENT DOCUMENTS

WO    2018213733 A1    11/2018

*Primary Examiner* — Kiho Kim
(74) *Attorney, Agent, or Firm* — John W. Wustenberg; Parker Justiss, P.C.

(57) ABSTRACT

The disclosure presents a process for determining an initial gain of a gamma detector located within a wellbore of a well system. The technique can utilize the subterranean formation characteristics at the gamma detector. The process can sweep, at a step value, across a determined high voltage range. At each sweep step, gamma events can be detected and counted over a detection time interval. The collected gamma events can then be utilized to perform an in-situ plateau test from which a high voltage can be determined, e.g., knee of the plateau curve. The determined high voltage can then be used as the initial gain. Additional fine gain control functions can be executed to further adjust the gain. In an alternative aspect, the collected gamma events can be utilized to perform diagnostics to infer faults or issues with the gamma detector assembly while it is down-hole.

19 Claims, 7 Drawing Sheets

(56) References Cited

U.S. PATENT DOCUMENTS

2016/0299251 A1* 10/2016 Luo .................. E21B 49/00
2016/0349404 A1* 12/2016 Guo .................. G01V 5/04
2016/0363688 A1* 12/2016 Jorion ............... G01T 1/171
2017/0139063 A1* 5/2017 Mickael ............. G01T 7/005

* cited by examiner

INITIAL GAIN ESTIMATION FOR GAMMA DETECTOR

TECHNICAL FIELD

This application is directed, in general, to calibrating a gamma detector and, more specifically, to determining an initial gain of the gamma detector within a well system.

BACKGROUND

Production and injection well systems can be formed by drilling wellbores through a subterranean formation. Gathering information about the wellbores is important for controlling and monitoring well system operations. Wellbore measurements can be obtained using different devices deployed in the wellbores via various conveyances, such as a wireline, and from different operations, such as logging while drilling and measurement while drilling. Gamma radiation measurement, e.g., counts, is an example of a wellbore measurement that is obtained using a gamma detector. The gamma detector can be part of a bottom hole assembly of a well system or lowered via a wireline into a wellbore. Being able to accurately adjust the gamma detector as the location of the detector changes, the temperature near the detector changes, and the time of operation elapses would be beneficial.

BRIEF DESCRIPTION

Reference is now made to the following descriptions taken in conjunction with the accompanying drawings, in which.

DETAILED DESCRIPTION

Gamma detectors can be used in various well systems, including logging while drilling (LWD), measurement while drilling (MWD), and wireline well systems. For example, naturally occurring or non-induced gamma radiation can be measured by a gamma detector deployed within a bottom hole assembly (BHA). Measurements of naturally occurring gamma radiation can be used for borehole imaging and other purposes, during or after drilling. Scintillator based detectors, such as those that comprise a crystal and a light detector, are an example of gamma detectors that can be used for high sensitivity natural gamma detecting operations. Such operations can be conducted within a wellbore of a well system, for example, a hydrocarbon production well system. Detectors can be used to infer subterranean formation characteristics, such as rock densities. This information can be inferred by the detectors by providing high efficiency and sensitivity in collecting gamma event counts from the subterranean formation.

As the gamma detector is used operationally, the gain used to calibrate the gamma detector can drift or the gain may need to be adjusted as the surrounding environment changes. For example, the detectors can exhibit large shifts in gain due to temperature changes. The gain should be periodically stabilized to account for the temperature, detector aging, and other factors. In some detectors, such as natural gamma detectors, a seed, e.g., check source, may not be efficient since the radioactivity from the seed can add error to the gamma event counts. Therefore, using the natural background gamma spectrum can lead to better gain control and stabilization.

Existing techniques, e.g., fine gain control functions, to stabilize the gain of the gamma detector using the background gamma spectrum are available. The existing techniques operate more efficiently when the initial high voltage, i.e., gain, is set to a level close to the desired level for the gamma detector and the subterranean formation. The initialized high voltage is important to improving the accuracy and speed of the fine gain control functions. Existing techniques may not handle naturally occurring gamma radiation such as characterized by low intensity counts, or other factors such as attenuation of the gamma radiation by environmental factors, for example, the wellbore casing, wellbore mud, wellbore fluids, and the surrounding subterranean formations.

This disclosure presents a technique to perform in-situ analysis and to estimate the initial high voltage for a gamma detector. The technique can be performed in real-time or near real-time, such that the gamma detector initial gain estimation can be performed while the gamma detector is downhole in a wellbore, e.g., in-situ. The technique can be accomplished by sweeping through a range of high voltages and counting the total number of gamma events, above a minimum threshold, at each step through the high voltage range. The gamma events can be utilized to obtain a plateau and determine the knee from the collected data. The high voltage value corresponding to the start of the knee can be utilized as the initial high voltage and assigned as the initial gain of the gamma detector.

In addition, the collected gamma events can be utilized to perform diagnostic analysis on the gamma detector. The pattern of the gamma events as the high voltage is stepped through its range can be used to infer certain issues with the gamma detector. These issues can be transmitted to other systems, for example, a BHA or a well site controller for further action, such as, sending an alert message or to indicate an end of life of the detector.

Figure 1A:
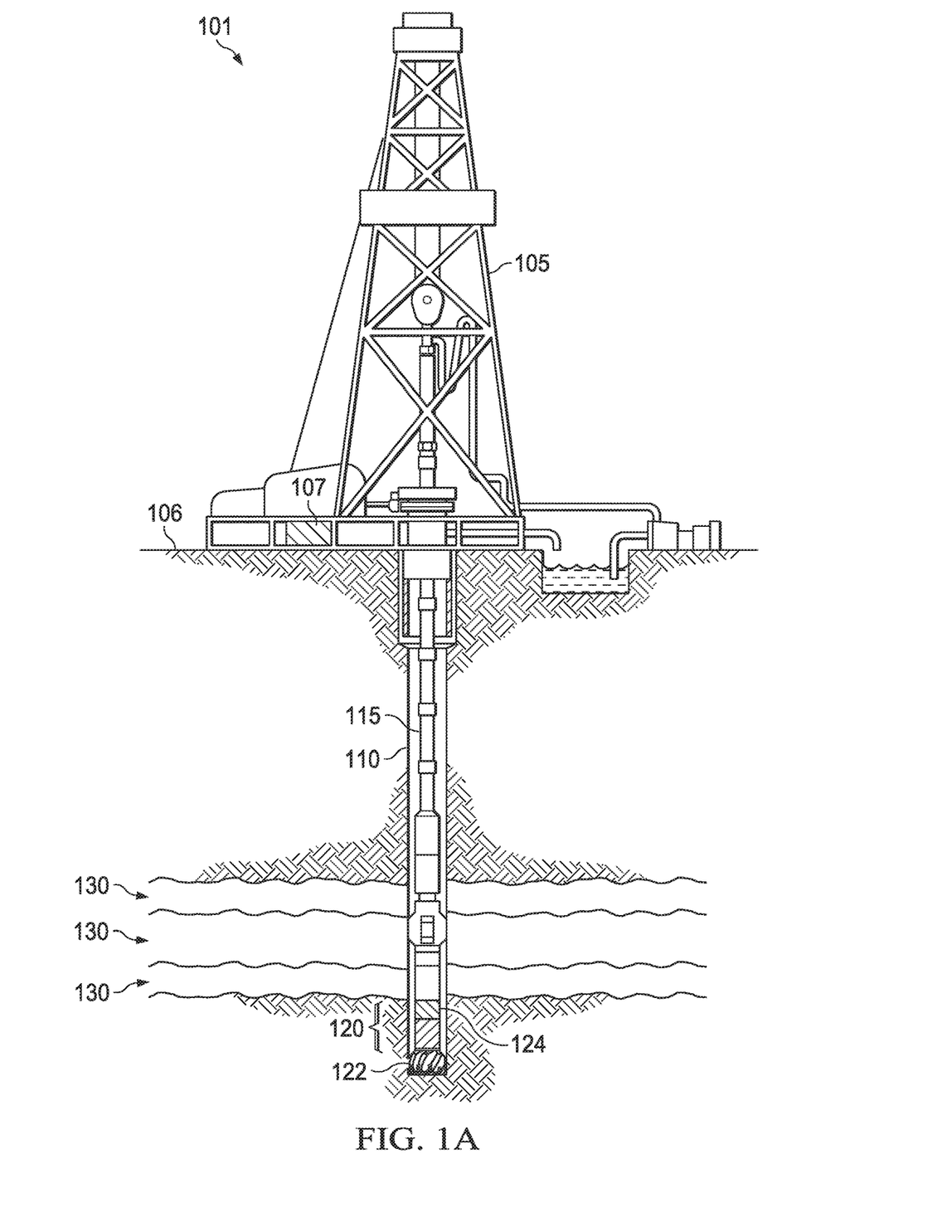
FIG. 1A is an illustration of a diagram of an example logging while drilling well system.

Turning now to the figures, FIG. 1A is an illustration of a diagram of an example LWD well system 101. A MWD well system can be utilized in a similar fashion as the LWD well system 101. The LWD well system 101 includes a derrick 105 supporting drill string 115, and well site controller 107. Derrick 105 is located at a surface 106. Extending below derrick 105 is wellbore 110 in which drill string 115 is inserted. Located at the bottom of drill string 115 is a drilling BHA 120. Drilling BHA 120 can include various bottom hole devices, such as a drill bit 122, and a gamma detector assembly 124. As illustrated in FIG. 1A, the LWD well system 101 also includes other components or devices that are commonly found in a LWD well system.

The gamma detector assembly 124 includes a gamma detector and can also include a power source. Instead of a power source, or in addition to the power source, power can be received from another system, for example, the BHA 120. Alternatively, power can be supplied through the drill string 115 to the gamma detector assembly 124. Once powered, the gamma detector can detect gamma radiation, as a gamma event, being emitted from the surrounding subterranean formation 130.

The gamma detector assembly 124 can perform the gain computations and estimations, and set the initial gain for the gamma detector. Alternatively, some of the analyzation and processing can occur locally within the gamma detector assembly 124 and some can occur in another system, for example, the drilling BHA 120 and the well site controller 107. As such, performing the gain computations and setting the initial gain can be distributed across multiple devices or components. The gamma detector assembly 124 can transmit the detected gamma events and other information about the gamma detector assembly 124, for example, the temperature and elapsed operating time, to another system. The gamma detector assembly 124 or one of the other systems can provide status and alert messages to a user, such as a well site engineer.

Figure 1B:
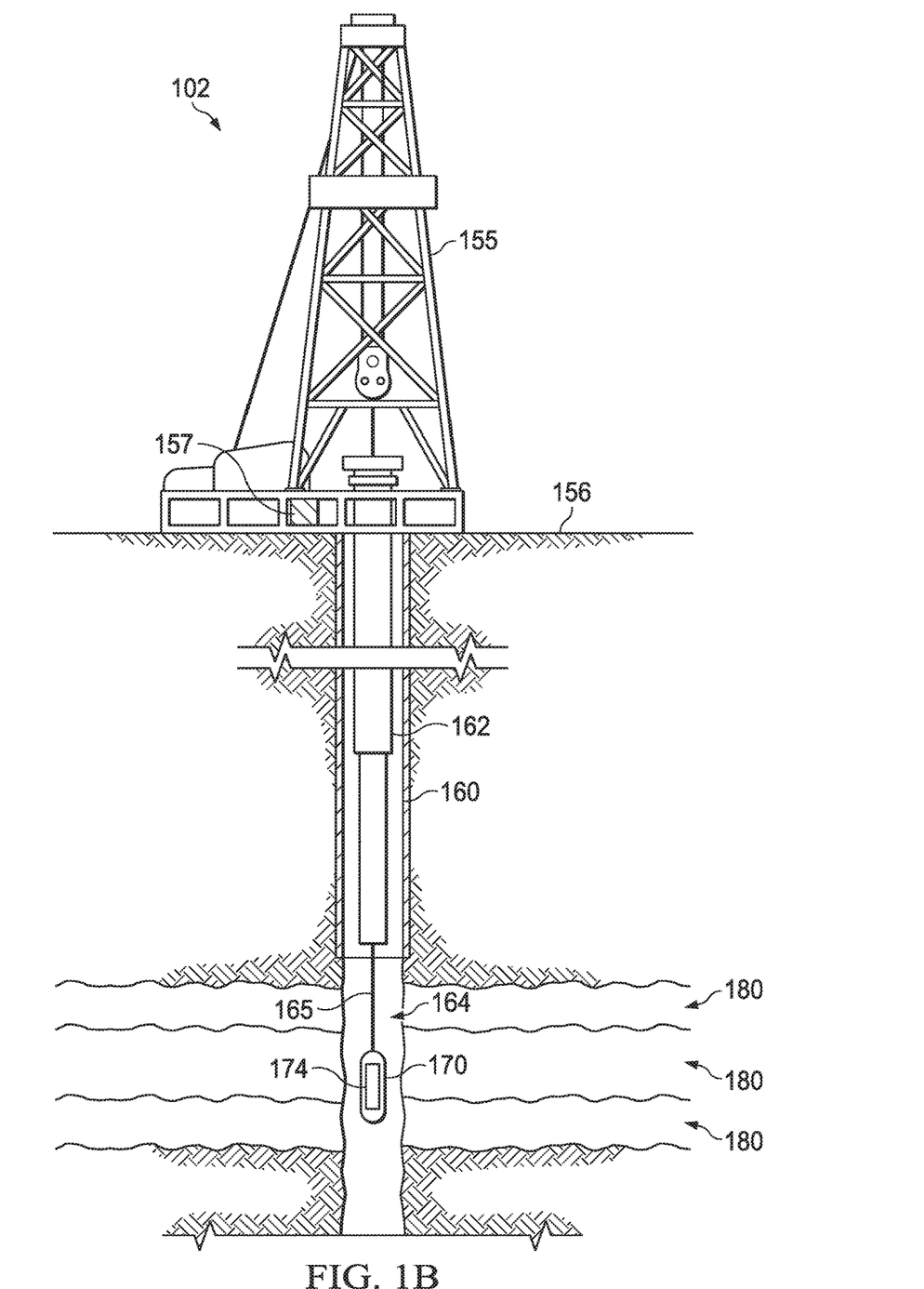
FIG. 1B is an illustration of a diagram of an example wireline well system.

FIG. 1B is an illustration of a diagram of an example wireline well system 102. Wireline well system 102 includes derrick 155 and well site controller 157. Derrick 155 is located at a surface 156. Below derrick 155 is wellbore 160 that has two cased sections 162 and one uncased section 164. A wireline 165 is suspended in wellbore 160 from derrick 155. At the lower end of the wireline 165 are downhole tools 170 and a gamma detector assembly 174. As illustrated in FIG. 1B, the wireline well system 102 also includes other components or devices that are commonly found in a wireline well system.

Similar to FIG. 1A, gamma detector assembly 174 can be powered via an internal power source, from the downhole tools 170, and from a surface power source transmitted through wireline 165. The gamma detector assembly 175 can perform a varied high voltage range test and utilize the detected gamma events to compute an estimated initial gain for the gamma detector. The gamma radiation can be emitted from the surrounding subterranean formation 180. The functional processing of the gamma detector assembly 175 is similar to that described for the gamma detector assembly 124 of FIG. 1A.

Although FIGS. 1A and 1B depict specific borehole configurations, those skilled in the art will understand that the disclosure is equally well suited for use in wellbores having other orientations including vertical wellbores, horizontal wellbores, slanted wellbores, multilateral wellbores, and other wellbore types. FIGS. 1A and 1B depict an onshore operation. Those skilled in the art will understand that the disclosure is equally well suited for use in offshore operations. Additionally, those skilled in the art will understand that wireline is an example of a conveyance device and other types of conveyance devices, such as a slickline, can be used.

Figure 2A:
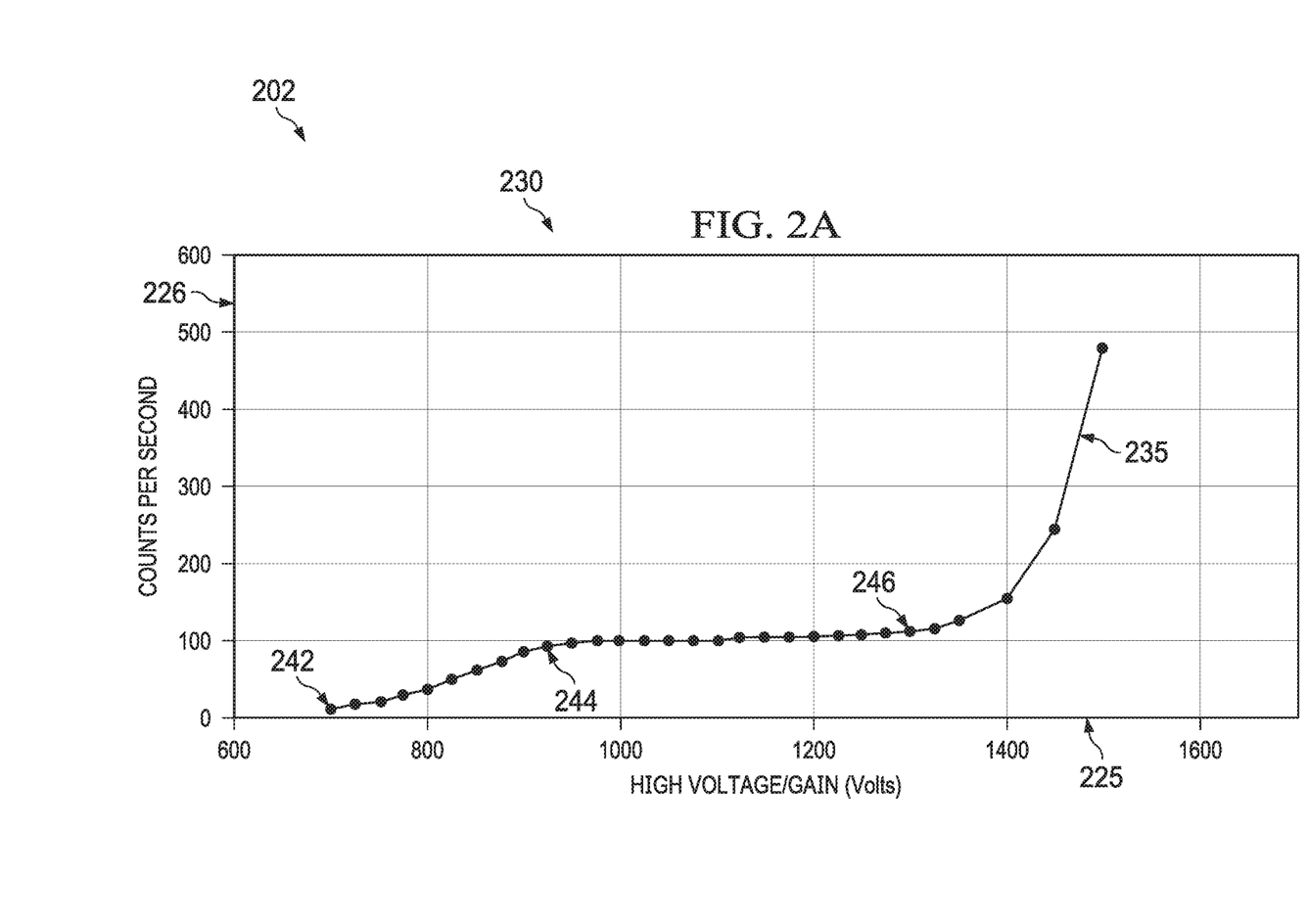
FIG. 2A is an illustration of a diagram of an example chart showing a high voltage knee value identification.

FIG. 2A is an illustration of a diagram of an example chart 202 that identifies a high voltage knee value that can be used for the initial gain of a gamma detector. Chart 202 includes plotted line area 230 demonstrating an increase in detected gamma events as the voltage is increased. Plotted line area 230 has an x-axis 225 and a y-axis 226. The x-axis 225 represents the high voltage amounts in volts (V), i.e., the voltage level for which gamma events have been counted, over a detection time interval. The y-axis 226 represents the total gamma event counts over the detection time interval.

Plotted line area 230 includes a plotted line 235 showing the detected gamma events for various high voltage data collection points. Plotted line 235 is partially defined by the high voltage collections points of 700V 242, 925V 244, 1300V 246, and other high voltage collection points that are not denoted in FIG. 2A. 925V 244 is a high voltage knee point, e.g., a plateau point of the plotted line 235, and the corresponding voltage can be used to set the initial gain of the gamma detector. The gain can be set at or slightly below the high voltage knee value. In this example, the high voltage knee value is estimated to be 925 V.

Figure 2B:
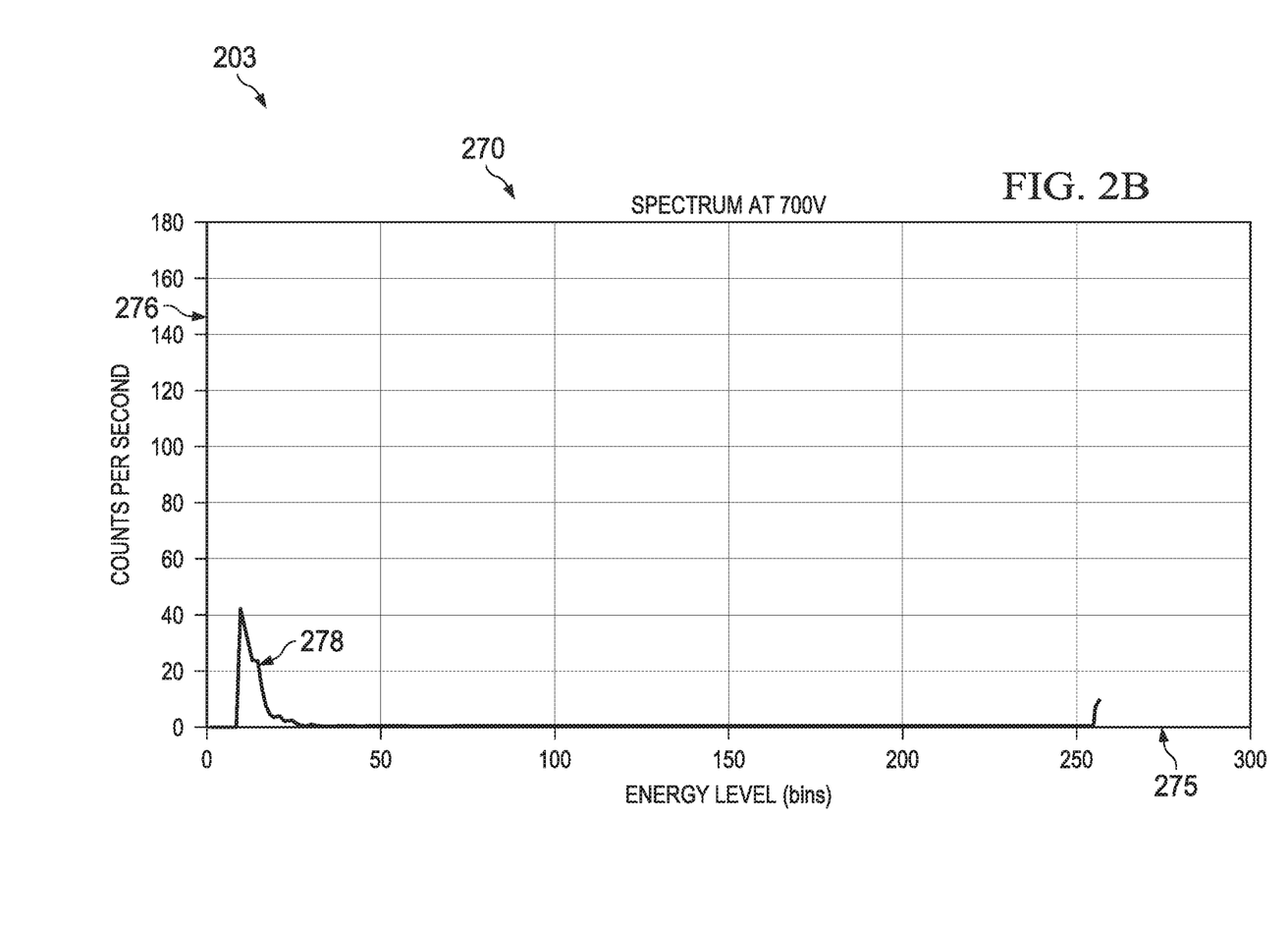
FIG. 2B is an illustration of a diagram of an example chart showing a gamma spectra count for a corresponding 700 volts.

FIG. 2B is an illustration of a diagram of an example chart 203 showing a gamma spectra count for the corresponding voltage 700V, using the data from FIG. 2A. Chart 203 represents a histogram count or spectra of gamma events at an energy level measured in energy bins for the 700V 242 high voltage data collection point shown in chart 202. This is shown for illustration only. The spectra show how the counts or gamma events are distributed per energy levels. Chart 203 includes a plotted line area 270 showing the high voltage data collection point as a histogram line plotted against detected counts per second of gamma events. Plotted line area 270 has an x-axis 275 representing the energy in energy bins detected from the high voltage data collection point. Plotted line area 270 also includes a y-axis 276 representing the detected counts per second for the gamma events.

Line 278 in the plotted line area 270 corresponds to the histogram of 700V 242. Line 278 demonstrates a voltage that is too low to be used for the initial gain. Gamma counts at a low energy point, compared to other data collection points, can indicate a low voltage, meaning that the gain at that voltage level is too low.

Figure 2C:
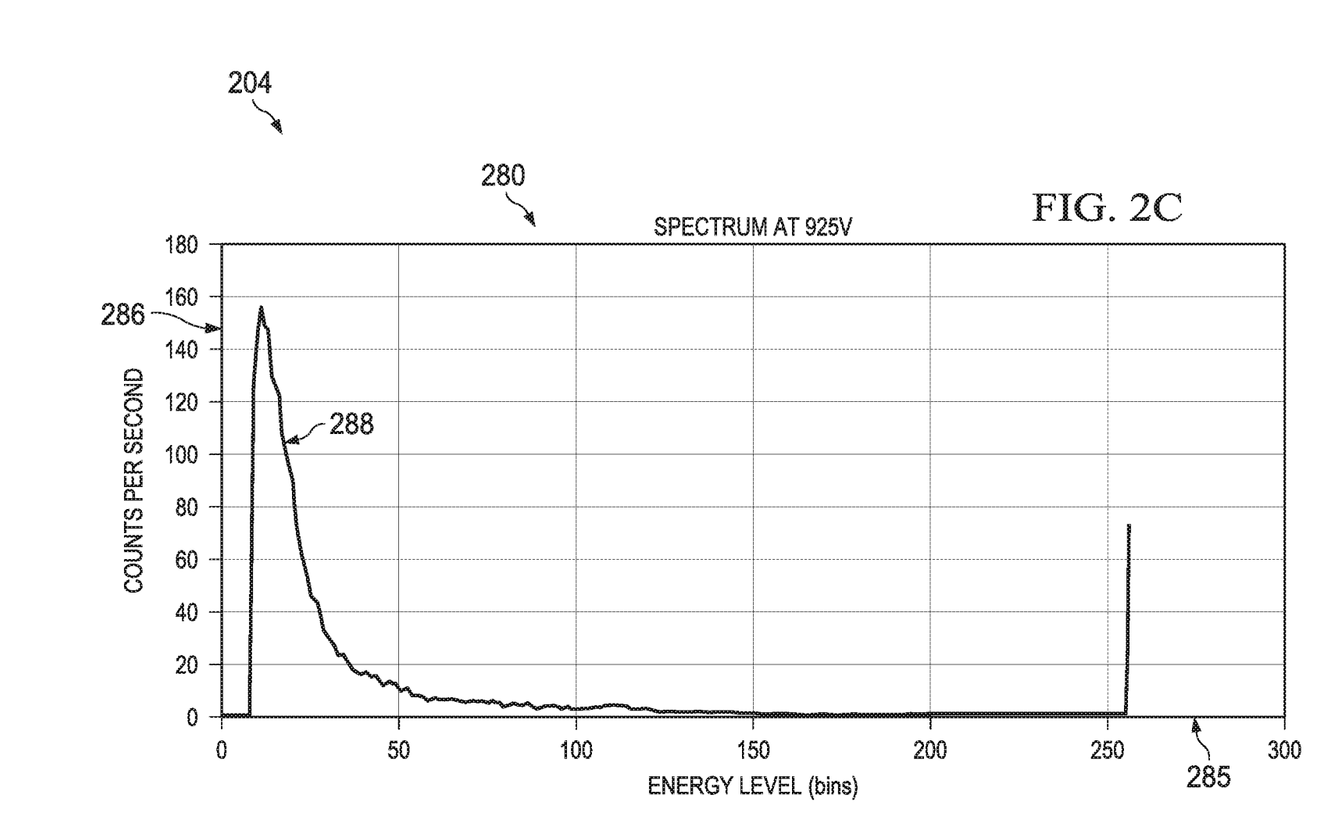
FIG. 2C is an illustration of a diagram of an example chart showing a gamma spectra count for a corresponding 925 volts.

FIG. 2C is an illustration of a diagram of an example chart 204 showing a gamma spectra count for the corresponding voltage 925V, using the data from FIG. 2A. Chart 204 represents a histogram count or spectra of gamma events at an energy level measured in energy bins for the 925V 244 high voltage data collection point shown in chart 202. This is shown for illustration only. The spectra show how the counts or gamma events are distributed per energy levels. Chart 204 includes a plotted line area 280 showing the high voltage data collection point as a histogram line plotted against detected counts per second of gamma events. Plotted line area 280 has an x-axis 285 representing the energy in energy bins detected from the high voltage data collection point. Plotted line area 280 also includes a y-axis 286 representing the detected counts per second for the gamma events.

Line 288 in the plotted line area 280 corresponds to the histogram of 925V 244. Line 288 demonstrates a stabilized gamma spectrum and can be utilized as the gain. As it can be seen, the spectrum obtained at 925V 244 shows that the counts are distributed optimally; the gain is not too low or too high. Thus a simple plateau test can be used in-situ to obtain the optimal initial high voltage. Since the process is summing the detected gamma events, the process is effectively applying a low pass filter on the detected gamma data to remove noise.

Figure 2D:
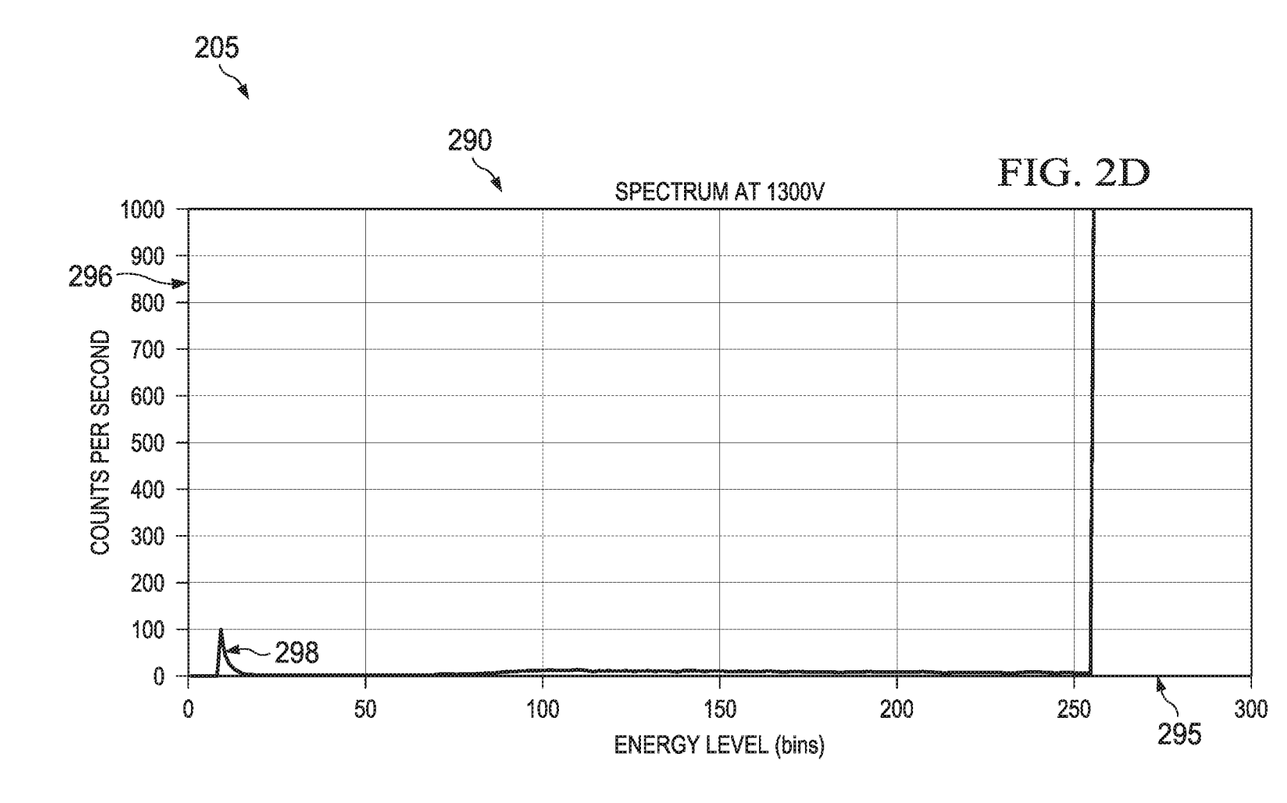
FIG. 2D is an illustration of a diagram of an example chart showing a gamma spectra count for a corresponding 1300 volts.

FIG. 2D is an illustration of a diagram of an example chart 205 showing a gamma spectra count for the corresponding voltage 1300V, using the data from FIG. 2A. Chart 205 represents a histogram count or spectra of gamma events at an energy level measured in energy bins for the 1300V 246 high voltage data collection point shown in chart 202. This is shown for illustration only. The spectra show how the counts or gamma events are distributed per energy levels. Chart 205 includes a plotted line area 290 showing the high voltage data collection point as a histogram line plotted against detected counts per second of gamma events. Plotted line area 290 has an x-axis 295 representing the energy in energy bins detected from the high voltage data collection point. Plotted line area 290 also includes a y-axis 296 representing the detected counts per second for the gamma events.

Line 298 in the plotted line area 290 corresponds to the histogram of 1300V 246. Line 298 demonstrates a voltage that is too high to be used for the initial gain as the shape indicates that the voltage used to generate line 298 is above the knee—the voltage is plateauing.

Figure 3:
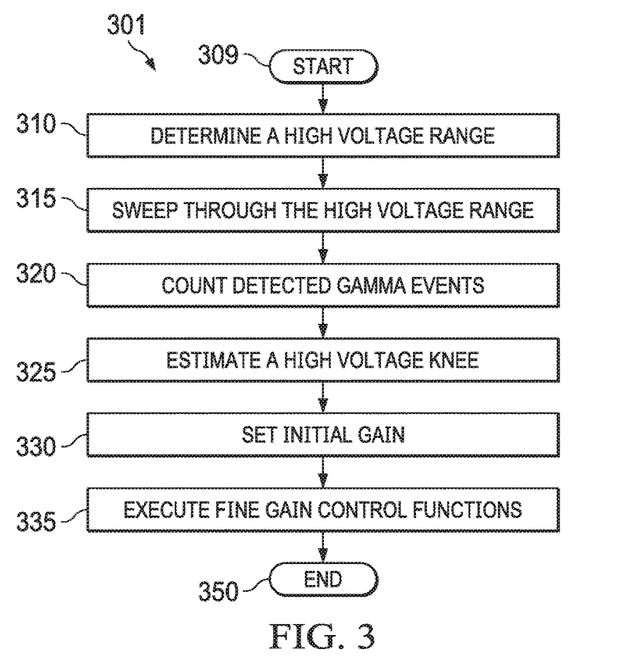
FIG. 3 is an illustration of a flow diagram of an example method for setting an initial gain for a gamma detector.

FIG. 3 is an illustration of a flow diagram of an example method 301 for setting an initial gain for a gamma detector. At least some of the steps of the method 301 can be performed by a gamma processor as disclosed herein. In one example, at least a portion of the method 301 is stored on a non-transitory computer-readable medium as a series of operating instructions. Method 301 starts at a step 309 and proceeds to a step 310. In the step 310, a high voltage range is determined. The high voltage range can be of various voltage ranges and can be adjusted by various factors, such as the equipment being used, previous executions of the described process, temperature changes, and the characteristics of the subterranean formation. In an alternative aspect, a lookup table can be utilized to find a specific high voltage range. In some circumstances, the adjusted range can be a single voltage, e.g., a lookup table provides a single high voltage for a set of factors. In an alternative aspect, an algorithm can be utilized in place of or in conjunction with the lookup table. The various factors for determining the high voltage range can be used as inputs into the algorithm or lookup table. A smaller high voltage range can improve the speed of determining the initial gain adjustment. For example, a typical range can be 700 volts to 1100 volts, such as visually demonstrated in FIG. 2A.

A sweep step value is utilized to sweep through the high voltage range to limit measurements within the range to certain points within the range. These points are high voltage data collection points. Examples of the sweep step value are 20 or 50 volts. The sweep step value can be determined or specified by an input to the process. Larger sweep step values can improve the speed of estimating the initial gain at a cost of lowering the accuracy of the estimation. Smaller sweep step values can impact the speed of estimating the initial gain while improving the accuracy of the estimation. The sweep step value can be determined by dividing the high voltage range into equal portions. The sweep step value can be fixed for sweeping through the high voltage range; at least for one sweep. Alternatively, a variable sweep step value can be utilized, such as using a smaller sweep step value in a portion of the high voltage range where the estimated initial gain is likely to be identified. Further, for larger sweep steps the system can utilize interpolation to find the optimal knee point.

In addition, a detection time interval to collect gamma counts can be determined at each sweep step value. The detection time interval can be a default value, be derived from previous executions of the described process, or be dynamically determined utilizing the rate of gamma detection. Higher detection rates at a particular high voltage value can mean that a lower detection time interval can be utilized for that high voltage value. Lower detection rates can mean that a higher detection time interval can be utilized. When a dynamically determined detection time interval is utilized, the collected gamma counts for each high voltage value will be normalized, for example, adjusting to a rate count, such as a count per second.

In a step 315, each high voltage data collection point is processed in a sweep fashion. The sweep range can begin at the lowest or highest portion of the high voltage range. In a step 320, the number of gamma events detected at the current high voltage data collection point is counted over the specified detection time interval, for example, twenty or thirty seconds. Other detection time intervals can be used. The count can be expressed as a total count of gamma events over that detection time interval or expressed as a count of gamma events per second. Other representations of the data can be utilized.

In some aspects, a gamma event threshold can be utilized. The gamma event threshold can be used to filter out gamma events that fall below the threshold, thereby improving the quality of the counted gamma events, e.g., by setting the detection above the noise floor. At the end of each sweep step, the total detected gamma events are recorded.

After the detected gamma events are recorded, another high voltage data collection point is identified, such as by adjusting the voltage by the sweep step value. The sweep process of steps 315 and 320 end when the high voltage data collection point falls outside of the high voltage range.

When the sweep process terminates from steps 315 and 320, method 301 proceeds to a step 325. In the step 325 the collected detected gamma events are analyzed to determine where a plateau begins. This is typically where the high voltage knee value is likely to be located. The analyzation can use estimation techniques to determine the high voltage knee value as collected gamma events may not present with a sharp delineation. In some aspects, this analyzation and estimation can be conducted within the gamma detector assembly. In other aspects, the collected gamma events and other gamma detector assembly information can be transmitted to other systems, for example, a well site controller or a BHA, for further processing. In yet another aspect, some of the processing can be conducted within the gamma detector assembly and some in another system. The gamma detector assembly information can include, among other diagnostic measurements and without limitation, the temperature at the gamma detector assembly, the elapsed time the gamma detector assembly has been in operation, and faults, errors, and failures detected by the gamma detector assembly.

In a step 330, the high voltage knee value, as estimated in step 325, is utilized to set the initial gain for the gamma detector. Once the high voltage knee value is obtained, it can be applied to the gain using conventional techniques. In a step 335, after the initial gain has been set, optional fine gain control functions can be executed to further fine tune the gain used with the gamma detector. The fine gain control functions can be those that are conventionally used. The method 301 ends at a step 350.

Method 301 can be executed at various times. For example, method 301 can be performed when the gamma detector assembly is first located at the subterranean formation within the wellbore. The method 301 can also be performed when the temperature changes around the gamma detector assembly by more than a specified temperature differential value, for example, ten degrees. The specified temperature differential value can be defaulted to a number or specified as an input to the system. The method 301 can also be performed after a specified elapsed time has occurred since the previous initial gain calibration, i.e., a re-detection time interval. Performing the method after a specified elapsed time can allow adjustment for gain drift. Other times when this method can be performed are, without limitation, a time when the gamma detector is powered up, a time when a command is received such as from an operator or another system, and a time when the system attempts to recover from a fault condition. The various times for executing determining the initial gain value can be collectively referred to as adjustment times.

Figure 4:
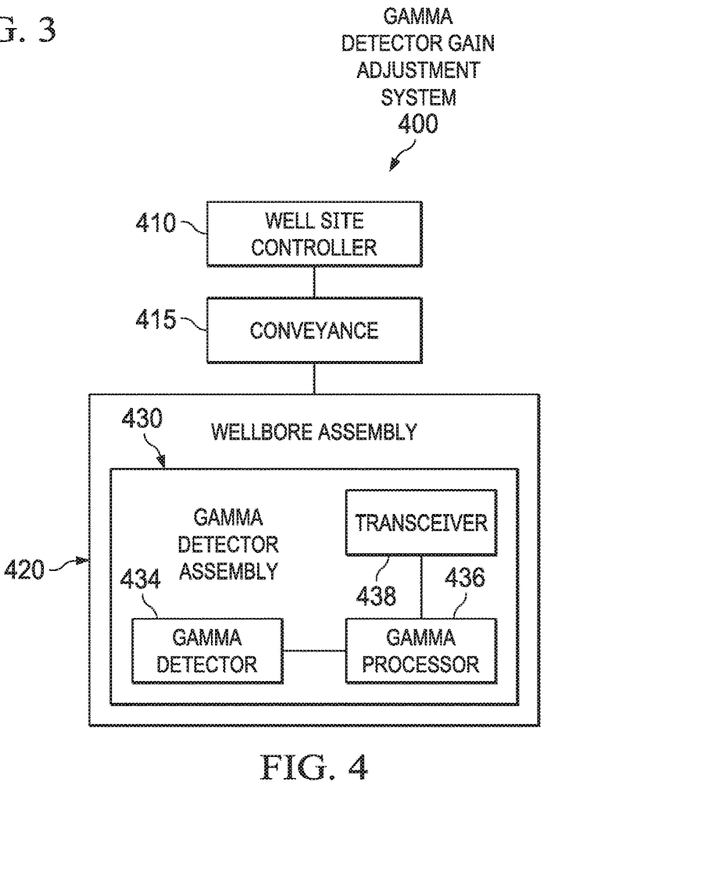
FIG. 4 is an illustration of a block diagram of an example gamma detector gain adjustment system.

FIG. 4 is an illustration of a block diagram of an example gamma detector gain adjustment system 400. The gamma detector gain adjustment system 400 can be used to adjust the high voltage gain utilizing, for example, the equipment being used and environmental factors. The gamma detector gain adjustment system 400 includes a gamma detector assembly 430 located within a wellbore of a well system. Typically, the gamma detector assembly 430 is part of a wellbore assembly 420. Wellbore assembly 420 can be a downhole tool (such as with a wireline well system) or part of a BHA (such as with a LWD or MWD well system). Gamma detector assembly 430 can include a gamma detector 434 and a gamma processor 436. Gamma detector assembly 430 can optionally include a transceiver 438 and a power source (not shown). Gamma detector assembly 430, by itself, or as part of a wellbore assembly 420 can be lowered into the wellbore by a conveyance 415, such as a drill string, a wireline, or slickline. Optionally, gamma detector gain adjustment system 400 can include a well site controller 410 as illustrated.

At a prescribed time or interval (e.g., at an adjustment time), the gamma detector assembly 430 can perform a gain adjustment process. The gain adjustment process can begin with estimating an initial gain for the gamma detector 434. The initial gain can be estimated through a sweep process through a high voltage range where detected gamma events are counted at specified high voltage data collection points within the high voltage range. The power can be supplied to the gamma detector 434. During each detection time interval, e.g., the time spent at each high voltage data collection point, the gamma detector counts the number of gamma events detected. The number of gamma events can be communicated to the gamma processor 436. At the end of the sweep process, the gamma processor 436 will have one or more sets of gamma events.

The gamma processor 436 can store the count of gamma events, along with the high voltage data collection point and detection time interval, in a data storage, such as a memory, a hard disk, a solid-state hard disk, USB key and other storage mediums, using a database, file, and other storage structures. The gamma processor 436 can analyze the collected sets of gamma events and estimate a high voltage knee value. The high voltage knee value can be used to initialize the gain. In some aspects, the gamma processor 436 can then execute additional fine gain control functions to further fine tune the gain of the gamma detector 434.

The gamma processor 436 can also utilize the collected data to perform diagnostics on the gamma detector 434. For example, if at a high voltage data collection point, too many or too few gamma events are detected, compared to other high voltage data collection points, then that condition can be indicative of a diagnostic issue. The various functions performed by the gamma processor 436 can be distributed over multiple devices or systems. Accordingly, the gamma processor 436 can be a distributed processor. For example, the gamma processor 436 can also transmit, via the transceiver 438, one or more of the sets of gamma events, a summary of the gamma events, the ambient temperature of the gamma detector assembly 430, and a failure or fault state of a component of the gamma detector assembly 430, if available, and other gamma detector assembly information. The transmission can be sent via a conventional communication system to another device or system, such as the well site controller 410 or to a BHA. The other system can include a processor that can perform the analyzation and estimation processes as described herein. The other system can then transmit the estimated initial gain to the gamma detector assembly 430. In an alternative aspect, the other system can analyze the received sets of gamma events to infer faults, problems, or issues with the gamma detector assembly 430. The pattern of the detected gamma events in the plateau test can provide information on possible issues with the gamma detector assembly 430. For example, a fault can be a loose wire in the gamma detector assembly 430. Based on the results of that analysis, an alert can be sent to yet another system or to a user, such as a well engineer or operator, or instructions can be sent to the gamma detector assembly 430 to adjust for the issue. As such, the functionality of the gamma processor 436 can be distributed wherein some of the processing and analyzation can occur within the gamma detector assembly 430 and some of the processing can occur in another system, such as a BHA or the well site controller 410.

The gamma detector assembly 430 and its components describe a functional view of the operations. The functions can be implemented in various combinations where data is communicated for processing. For example, the transceiver 438 can communicate with a transceiver of the wellbore assembly 420, which then communicates with the well site controller 410. Other combinations of the functionality are possible as well.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:
A. A method to determine a gamma detector gain of a gamma detector inserted into a wellbore of a well site, the method including: (1) determining a high voltage range utilizing the gamma detector and subterranean formation information of the well site, (2) sweeping through the high voltage range utilizing a high voltage step value to determine one or more high voltage data collection points, (3) counting detected gamma events at each high voltage data collection point utilizing the gamma detector, wherein the counting is performed for a detecting time interval prior to adjusting the high voltage data collection point to a subsequent high voltage data collection point utilizing the high voltage step value, and (4) estimating a high voltage knee value utilizing the count of detected gamma events.

B. A computer program product having a series of operating instructions stored on a non-transitory computer-readable medium that directs a data processing apparatus when executed thereby to perform operations to determine a gamma detector gain of a gamma detector inserted into a wellbore of a well site the operations including: (1) determining a high voltage range utilizing the gamma detector and subterranean formation information of the well site, (2) sweeping through the high voltage range utilizing a high voltage step value to determine one or more high voltage data collection points, (3) counting detected gamma events at each high voltage data collection point utilizing the gamma detector, wherein the counting is performed for a detecting time interval prior to adjusting the high voltage data collection point to a subsequent high voltage data collection point utilizing the high voltage step value, and (4) estimating a high voltage knee value utilizing the count of detected gamma events.

C. A system to estimate an initial gain of a gamma detector inserted into a wellbore of a well system, including: (1) a gamma detector, operable to detect gamma events across a specified high voltage range, and (2) a gamma processor, operable to analyze the detected gamma events, to compute an estimated high voltage knee value utilizing the detected gamma events, and setting the initial gain to the high voltage knee value.

Each of aspects A, B, and C can have one or more of the following additional elements in combination: Element 1: further comprising setting an initial gain to the high voltage knee value. Element 2: further comprising executing fine gain control functions utilizing the initial gain to determine the gamma detector gain. Element 3: further comprising performing a diagnostic analysis of the gamma detector utilizing the high voltage knee value, the detected gamma events, and a pattern of the count of detected gamma events. Element 4: wherein the subterranean formation information includes a temperature measurement. Element 5: wherein the detecting time interval is one or more of a default value, a specified value, and a determined value utilizing the gamma event detection count. Element 6: wherein the high voltage step value is determined by one or more of an approximate distribution of steps across the high voltage range, and a variable distribution of steps utilizing portions of the high voltage range. Element 7: wherein the counting detected gamma events further comprises applying a gamma event threshold and counting detected gamma events that are at or exceed the gamma event threshold. Element 8: wherein the method is performed at least one of a time when the gamma detector is first lowered into the wellbore, a time when the temperature at a location of the gamma detector changes by a temperature differential value, a time when a re-detection time interval has elapsed, a time when the gamma detector is powered up, a time when a command is received, and a time when the gamma detector attempts to recover from a fault condition. Element 9: wherein the sweeping further comprises reducing the high voltage range utilizing at least one of a lookup table, an algorithm, and information from previous executions of the method. Element 10: wherein the counting is performed by the gamma detector and the method further comprises transmitting the count of detected gamma events to a second system. Element 11: wherein the counting is performed by the gamma detector and the method further comprises performing the estimating at the second system. Element 12: further comprising a gamma detector assembly, operable to include the gamma detector and the gamma processor. Element 13: further comprising a wellbore assembly, operable to be maneuvered within the wellbore and to provide power to the gamma detector assembly, wherein the gamma detector assembly is included with the wellbore assembly, and where the wellbore assembly is one of a bottom hole assembly or a downhole tool. Element 14: wherein the gamma processor is a distributed processor that operates over multiple devices or systems. Element 15: wherein the gamma processor is further operable to perform diagnostic analysis of the gamma detector using the detected gamma events.

What is claimed is:

1. A method to determine a gamma detector gain of a gamma detector inserted into a wellbore of a well site, the method comprising:
determining a high voltage range utilizing the gamma detector and subterranean formation information of the well site;
sweeping through the high voltage range utilizing a high voltage step value to determine one or more high voltage data collection points, wherein the high voltage step value is determined by one or more of an approximate distribution of steps across the high voltage range, and a variable distribution of steps utilizing portions of the high voltage range;

counting detected gamma events at each high voltage data collection point utilizing the gamma detector, wherein the counting is performed for a detecting time interval prior to adjusting the high voltage data collection point to a subsequent high voltage data collection point utilizing the high voltage step value; and estimating a high voltage knee value utilizing the count of detected gamma events.

2. The method as recited in claim 1, further comprising:
setting an initial gain to the high voltage knee value; and
executing fine gain control functions utilizing the initial gain to determine the gamma detector gain.

3. The method as recited in claim 1, further comprising:
performing a diagnostic analysis of the gamma detector utilizing the high voltage knee value, the detected gamma events, and a pattern of the count of detected gamma events.

4. The method as recited in claim 1, wherein the subterranean formation information includes a temperature measurement.

5. The method as recited in claim 1, wherein the detecting time interval is one or more of a default value, a specified value, and a determined value utilizing the gamma event detection count.

6. The method as recited in claim 1, wherein the counting detected gamma events further comprises:
applying a gamma event threshold and counting detected gamma events that are at or exceed the gamma event threshold.

7. The method as recited in claim 1, wherein the method is performed at least one of a time when the gamma detector is first lowered into the wellbore, a time when the temperature at a location of the gamma detector changes by a temperature differential value, a time when a re-detection time interval has elapsed, a time when the gamma detector is powered up, a time when a command is received, and a time when the gamma detector attempts to recover from a fault condition.

8. The method as recited in claim 1, wherein the sweeping further comprises:
reducing the high voltage range utilizing at least one of a lookup table, an algorithm, and information from previous executions of the method.

9. The method as recited in claim 1, wherein the counting is performed by the gamma detector and the method further comprises:
transmitting the count of detected gamma events to a second system; and
performing the estimating at the second system.

10. A computer program product having a series of operating instructions stored on a non-transitory computer-readable medium that directs a data processing apparatus when executed thereby to perform operations to determine a gamma detector gain of a gamma detector inserted into a wellbore of a well site, the operations comprising:
determining a high voltage range utilizing the gamma detector and subterranean formation information of the well site;
sweeping through the high voltage range utilizing a high voltage step value to determine one or more high voltage data collection points, wherein the high voltage step value is determined by one or more of an approximate distribution of steps across the high voltage range, and a variable distribution of steps utilizing portions of the high voltage range;
counting detected gamma events at each high voltage data collection point utilizing the gamma detector, wherein the counting is performed for a detecting time interval prior to adjusting the high voltage data collection point to a subsequent high voltage data collection point utilizing the high voltage step value; and
estimating a high voltage knee value utilizing the count of detected gamma events.

11. The computer program product as recited in claim 10, the operations further comprising:
setting an initial gain to the high voltage knee value; and
executing fine gain control functions utilizing the initial gain to determine the gamma detector gain.

12. The computer program product as recited in claim 10, the operations further comprising:
performing a diagnostic analysis of the gamma detector utilizing the high voltage knee value, the detected gamma events, and a pattern of the count of detected gamma events.

13. The computer program product as recited in claim 10, wherein the detecting time interval is one or more of a default value, a specified value, and a determined value utilizing the gamma event detection count.

14. The computer program product as recited in claim 10, wherein the counting detected gamma events further comprises:
applying a gamma event threshold and counting detected gamma events that are at or exceed the gamma event threshold.

15. The computer program product as recited in claim 10, wherein the method is performed at least one of a time when the gamma detector is first lowered into the wellbore, a time when the temperature at a location of the gamma detector changes by a temperature differential value, a time when a re-detection time interval has elapsed, a time when the gamma detector is powered up, a time when a command is received, and a time when the gamma detector attempts to recover from a fault condition.

16. A system to estimate an initial gain of a gamma detector inserted into a wellbore of a well system, comprising:
a gamma detector, operable to detect gamma events across a specified high voltage range; and
a gamma processor, operable to analyze the detected gamma events, to compute an estimated high voltage knee value utilizing a count of the detected gamma events, and to set the initial gain to the high voltage knee value, wherein the count is determined utilizing a high voltage step value determined by one or more of an approximate distribution of steps across the high voltage range, and a variable distribution of steps utilizing portions of the high voltage range.

17. The system as recited in claim 16, further comprising:
a gamma detector assembly, operable to include the gamma detector and the gamma processor; and
a wellbore assembly, operable to be maneuvered within the wellbore and to provide power to the gamma detector assembly, wherein the gamma detector assembly is included with the wellbore assembly, and where the wellbore assembly is one of a bottom hole assembly or a downhole tool.

18. The system as recited in claim 16, wherein the gamma processor is a distributed processor that operates over multiple devices or systems.

19. The system as recited in claim 16, wherein the gamma processor is further operable to perform diagnostic analysis of the gamma detector using the detected gamma events.

* * * * *